United States Patent
Suar

(10) Patent No.: US 11,242,413 B2
(45) Date of Patent: Feb. 8, 2022

(54) METHOD AND SYSTEM FOR THE CONTROL OF A PLANT FOR THE CONTINUOUS PRODUCTION OF A POLYMER

(71) Applicant: VERSALIS S.P.A., San Donato Milanese (IT)

(72) Inventor: Marianna Suar, Ferrara (IT)

(73) Assignee: VERSALIS S.P.A., San Donato Milanese (IT)

( * ) Notice: Subject to any disclaimer, the term of this patent is extended or adjusted under 35 U.S.C. 154(b) by 323 days.

(21) Appl. No.: 16/321,849

(22) PCT Filed: Aug. 2, 2017

(86) PCT No.: PCT/IB2017/054731
§ 371 (c)(1),
(2) Date: Jan. 30, 2019

(87) PCT Pub. No.: WO2018/025201
PCT Pub. Date: Feb. 8, 2018

(65) Prior Publication Data
US 2019/0169319 A1    Jun. 6, 2019

(30) Foreign Application Priority Data

Aug. 3, 2016  (IT) .......................... 1020160081868

(51) Int. Cl.
*C08F 2/01* (2006.01)
*B01J 19/00* (2006.01)
(Continued)

(52) U.S. Cl.
CPC ............ *C08F 2/01* (2013.01); *B01J 19/0033* (2013.01); *B01J 19/06* (2013.01); *B01J 19/2465* (2013.01);
(Continued)

(58) Field of Classification Search
USPC ...................................... 526/59–61; 700/269
See application file for complete search history.

(56) References Cited

U.S. PATENT DOCUMENTS

| 6,718,234 B1 | 4/2004 | Demoro et al. |
| 2003/0105247 A1 | 6/2003 | Braganca et al. |
| 2013/0296506 A1 | 11/2013 | Lawson et al. |

FOREIGN PATENT DOCUMENTS

| CA | 964353 | 3/1975 |
| EP | 1 259 554 A1 | 11/2002 |

(Continued)

OTHER PUBLICATIONS

Office Action dated Apr. 30, 2020 in corresponding Russian Patent Application No. 2019103877/04(007283) (with English Translation and English Translation of Category of Cited Documents), 13 pages.

(Continued)

*Primary Examiner* — Fred M Teskin
(74) *Attorney, Agent, or Firm* — Oblon, McClelland, Maier & Neustadt, L.L.P.

(57) ABSTRACT

A method for the control of a plant (10) for the production in continuous of a polymer, wherein the plant (10) comprises at least one reactor (11) fed with at least a first monomer and a second monomer, a first stripper (12), a second stripper (17), a third stripper (18), at least one recycling vat (13) of the fine products, measurement equipment (14) and a control system comprising distributed control devices (15) controllable by at least one electronic processing and control unit (16) based on a plurality of control variables, the control method comprising the following steps: collecting data comprising recipe parameters, laboratory analysis results and predefined coefficients stored in a database (40); collecting the data measured by the measurement equipment (14); determining, by means of a first calculation module (20) a production potentiality value of the at least one reactor (Continued)

(11); determining, by means of a second calculation module (21) the polymer concentration in the at least one reactor (11), in the first stripper (12) and in the at least one recycling vat of the fine products (13); determining, by means of a third calculation module (22) the flow-rate of oil for feeding the second stripper (17); determining, by means of a fourth calculation module (23), the flow-rate of the chain terminator (TERM) for feeding the at least one reactor (11), controlling the plant (10) on the basis of the plurality of control variables.

10 Claims, 2 Drawing Sheets

(51) Int. Cl.
*B01J 19/06* (2006.01)
*B01J 19/24* (2006.01)
*C08F 2/04* (2006.01)
*C08F 2/38* (2006.01)
*C08F 2/44* (2006.01)

(52) U.S. Cl.
CPC .................. *C08F 2/04* (2013.01); *C08F 2/38* (2013.01); *C08F 2/44* (2013.01); *B01J 2219/00164* (2013.01); *B01J 2219/00186* (2013.01); *C08F 2400/02* (2013.01)

(56) References Cited

FOREIGN PATENT DOCUMENTS

| JP | 11-152301 A | 6/1999 |
|----|----|----|
| JP | 2000-500060 A | 1/2000 |
| JP | 2002-504955 A | 2/2002 |
| JP | 2003-519255 A | 6/2003 |
| JP | 2007-500279 A | 1/2007 |
| JP | 2007-510023 A | 4/2007 |
| JP | 2017-538842 A | 12/2017 |
| RU | 2 257 935 C2 | 8/2005 |

OTHER PUBLICATIONS

International Search Report dated Nov. 3, 2017 in PCT/IB2017/054731 filed on Aug. 2, 2017.
Notification of Reasons for Refusal dated Dec. 15, 2020 in Japanese Patent Application No. 2019-504929 (with English translation), 5 pages.

METHOD AND SYSTEM FOR THE CONTROL OF A PLANT FOR THE CONTINUOUS PRODUCTION OF A POLYMER

The present invention relates to a method and a system for the control of a plant for the production in continuous of a polymer, in particular ethylene-propylene or EPR rubbers and ethylene-propylene-diene monomer or EPDM rubbers.

In the following description, reference will be made for the sake of simplicity and not for limiting purposes to EPR and EPDM rubbers.

As is known, EPR and EPDM rubbers are produced by means of a complex production process that can be divided into three different steps i.e. the reaction step, the stripping step and the finishing step, which are carried out in a reaction section, in a stripping section and in a finishing section respectively of a production plant.

In the reaction step, a reactor is fed with two reagents, a first monomer and a second monomer, and possibly with a third reagent, a third monomer or so-called diene. In addition to the reagents, a catalyst, a co-catalyst, an activator and a chain terminator, are mainly introduced into the reactor.

The subsequent stripping step has the aim of recovering the non-reacted monomers and is effected by the stripping section composed of a high-pressure stripper and two low-pressure strippers, into which steam is injected.

In the final finishing step, the product, i.e. the EPR and EPDM rubber, is extruded, dried and pressed into bales for packaging.

The production process of EPR and EPDM rubbers will not be further described as it is known to skilled persons in the art.

In any case, the production plant which implements this process comprises a plurality of dosing devices of the single reagents, measurement instrumentation and equipment known to skilled persons in the art.

This type of production plant is generally controlled centrally by a control system capable of controlling and monitoring the devices, instruments and equipment of the plant. This control system comprises one or more electronic processing and control units, for example one or more microprocessors, programmed and configured for monitoring and controlling the plant devices, instruments and equipment by means of a plurality of actuators. The production process is generally based on a series of control parameters that represent the dosages of the different reagents, the physical conditions of the various steps and so forth. These parameters are provided in programs or recipes that are designed for ensuring that certain production specifications are met. The setting of these parameters is effected by means of the regulation and control of the plant devices, instruments and equipment. In particular, in order to ensure that a product is obtained which meets a series of desired requirements, for example, regulations of the dosages of the various reagents are executed. These regulations are based on the results of laboratory analyses carried out on product samples taken at the outlet periodically and analyzed in the laboratory; if these samples do not meet the desired requirements or quality specifications, the operators modify the dosage parameters to try and obtain a product that falls within these specifications. These modifications are therefore determined based on the results of the laboratory analyses, the historical production data, in addition to the experience of the operators themselves. It is, therefore, an empirical control that is carried out by setting a series of control or operating parameters by means of the electronic processing and control units. This type of control has various drawbacks.

A first drawback lies in the non-deterministic nature of the regulations which, in fact, are based on the judgment and subjective experience of the operators.

A second drawback lies in the fact that the necessity of effecting regulations is based on the observation of data resulting from laboratory analyses carried out periodically and not in real time directly on the final or intermediate product.

Considering that plenty of fine regulations may be necessary before obtaining a product that falls within the desired specifications and that the production plant under examination operates in continuous, it can be understood how the production efficiency of the plant can be significantly affected by the effectiveness of the control methodology of the production process.

The objective of the present invention is to overcome the drawbacks mentioned above and in particular, to devise a method and a system for the control of a plant for the continuous production of a polymer which allow the control parameters to be optimized in a short time, guaranteeing a greater production efficiency than provided by the prior art.

This and other objectives according to the present invention are achieved by providing a method and a system for the control of a plant for the production in continuous of a polymer as specified in the independent claims.

Further features of the method and system for the control of a plant for the production in continuous of a polymer are object of the dependent claims.

The characteristics and advantages of a method and a system for the control of a plant for the production in continuous of a polymer according to the present invention will appear more evident from the following illustrative and non-limiting description, referring to the enclosed schematic drawings in which.

Figure 1:
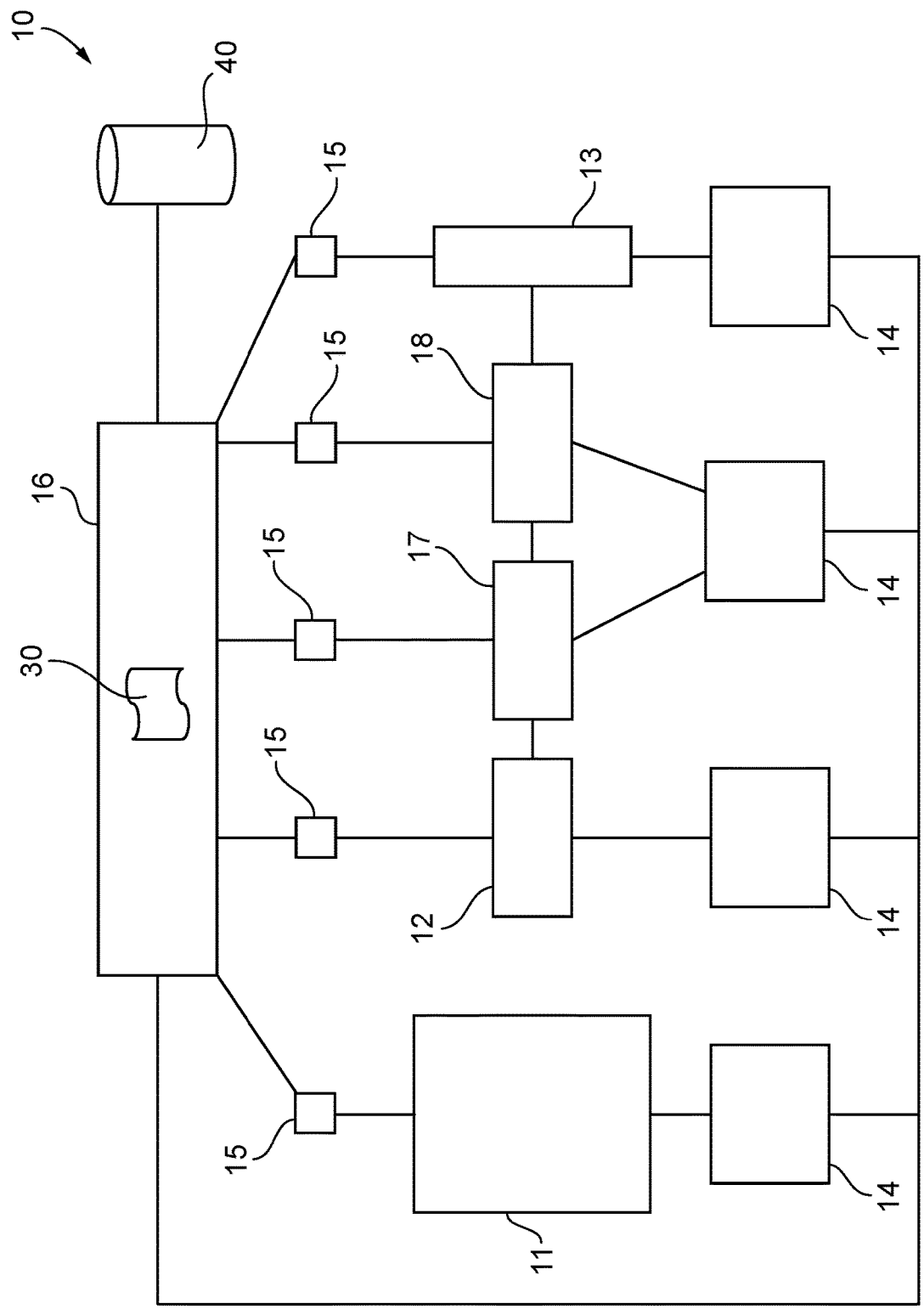
FIG. 1 is a block scheme of a plant for the production in continuous of a polymer according to the present invention.
Figure 2:
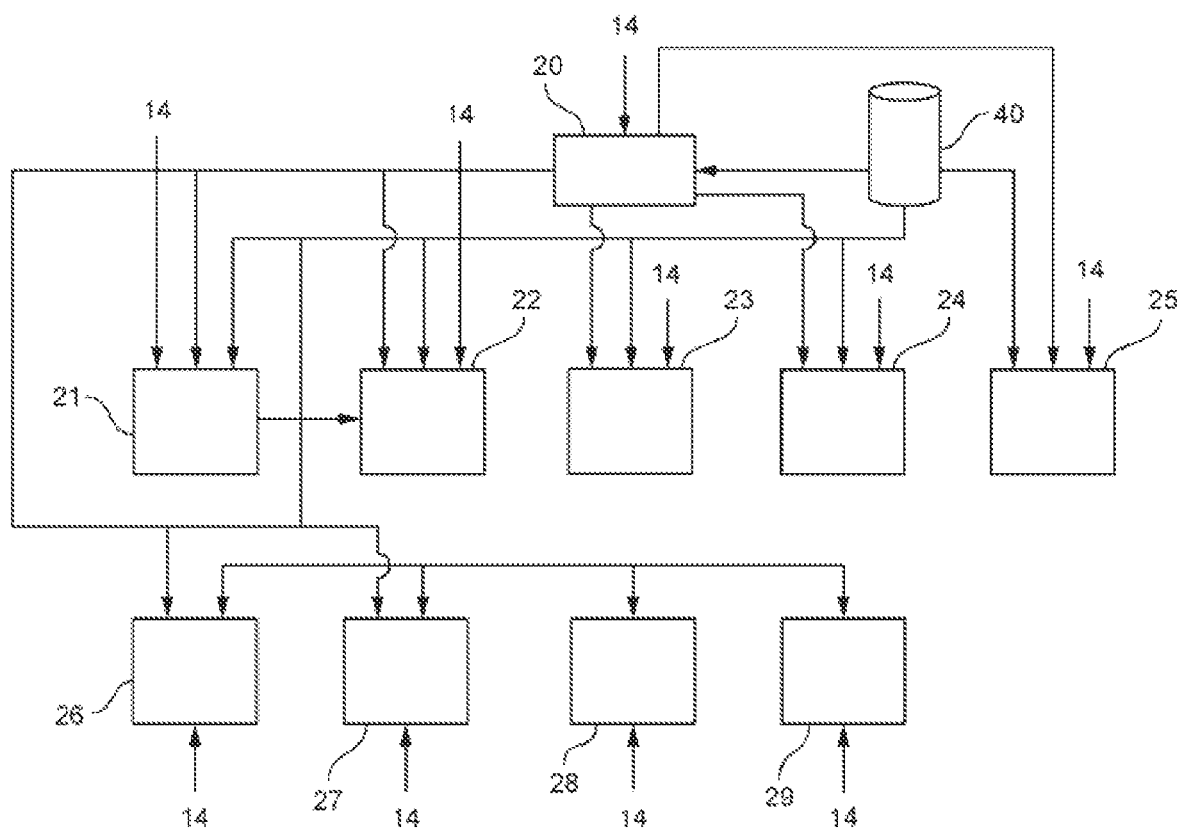
FIG. 2 is a block scheme representing the calculation modules provided in the method for the control of the plant of FIG. 1 according to the present invention.

With reference to FIG. 1, this shows a plant for the production in continuous of a polymer, indicated as a whole with 10.

In the present description, the steps of the method for the production of polymers will not be described as they are known in the state of the art.

The plant 10 comprises a reaction section comprising at least one reactor 11 fed with at least a first monomer and a second monomer, a stripping section, comprising a first high-pressure stripper 12, a second low-pressure stripper 17 and a third low-pressure stripper 18, a finishing section comprising at least one vat 13 for recycling the fine products, a plurality of measurement equipment 14 of the operating conditions of the plant 10 and a control system comprising a plurality of distributed control devices 15 which can be driven by at least one central electronic processing and control unit 16 on the basis of a plurality of control variables comprising the flow-rate of oil with which the first stripper is fed, the flow-rate of chain terminator with which the at least one reactor 11 is fed and the vent flow-rate of the thermostatic control circuit of reactor 11.

In the present description, high pressure means a stripping pressure ranging from 16 to 18 barg.

Low pressure means a stripping pressure ranging from 4.5 to 6 barg.

The second stripper 17 is connected in cascade to the first stripper 12 and the third stripper 18 is connected in cascade to the second stripper 17.

The distributed control devices 15 are, for example, dosing devices or valves capable of varying the feed rate of a reagent to a certain section of the plant.

Reference will be made hereafter, for the sake of simplicity and not for limiting purposes, to EPR rubbers and EPDR rubbers.

In particular, for the production of EPR rubbers, the reactor is fed with a first monomer, typically ethylene, and a second monomer, typically propylene; for the production of EPDR rubbers, a third monomer, typically diene, is added to these monomers.

For the sake of simplicity, reference will be made hereafter to ethylene as first monomer, propylene as second monomer and diene as third monomer. All considerations expressed with reference to ethylene, propylene and diene can be considered as being generalizable with respect to the first, second and third monomer, respectively.

The at least one central electronic processing and control unit 16 advantageously comprises software means 30 configured for implementing the steps of a control method according to the present invention which is described hereunder.

In particular, said software means 30 are a program or set of programs for a computer that can be downloaded into the memory of the central electronic processing and control unit 16 itself and comprising portions of software code for implementing the steps of the method according to the present invention.

The control method advantageously involves controlling the plant 10 based on the plurality of variables and control indicators calculated by a plurality of calculation modules. These calculation modules are mainly groups of calculation instructions that contribute to the control of the plant 10. The calculation modules do not necessarily need to be executed in succession to each other according to a pre-established order; it is possible, however, for the calculation instructions of one calculation module to depend on the results of the calculation instructions of another calculation module. In this latter case, in fact, the implementation of one calculation module can depend on the previous implementation of one or more "preparatory" calculation modules.

In any case, the control method provides, first, collecting a plurality of data comprising recipe parameters, results of laboratory analyses and pre-defined coefficients stored in a database 40, and collecting the data revealed by the measurement equipment.

The recipe parameters are predefined and relate to standard operating conditions to be obtained in the plant or to dosages of reagents necessary for obtaining a product that meet production specifications. The results of the laboratory analyses, on the other hand, relate to analyses carried out on sample products collected at the outlet of the plant at pre-established time intervals. Predefined coefficients refer to parameters used for the calculation of the variables.

The measurement equipment can consist, for example, of chromatographs and other detectors commonly used in this type of plant.

The control method according to the present invention comprises the step wherein a production potential value of the at least one reactor 11 is determined—by means of a first calculation module 20 of the above-mentioned plurality of calculation modules—on the basis of the recipe parameters, the laboratory analysis results, the predefined coefficients and the data detected by the measurement equipment.

The production potential value of the at least one reactor 11 is preferably calculated as the ratio between the recycling flow-rate to the reactor, detected by means of one of the measurement apparatuses, and a conversion factor F.

The recycling flow-rate is measured by means of a measurement instrument of the "Coriolis" mass-type and in particular, the volumetric output ($m^3/h$) and density (kg/h) are acquired through this instrument.

The potentiality of the reactor 11 is expressed in t/h of dry rubber produced, whereas the recycling flow-rate to the reactor is expressed in $m^3/h$. In the preferred embodiment of the present invention, the first module 20 is configured for calculating:

Propylene density in relation to the temperature of the propylene fed to the reactor 11;
Finishing potentiality;
Conversion factor F;
Potentiality of the reactor;
Set point (SP_COCAT) of the co-catalyst flow-rate (COCAT) expressed in l/h;
Set point (SP_ATT) of the activator flow-rate (ATT) expressed in l/h;
Yield expressed in kg of rubber/g of catalyst (CAST);
Total solid;
Set point of the flow-rate of the second monomer fed to the reactor 11 expressed in kg/h; if the second monomer is propylene, the flow-rate set point is indicated in SP_Propylene.

The catalysts, co-catalysts, activators used in the process are among those provided by the known Ziegler-Natta catalysis.

The total solid is the weight percentage of rubber with respect to the total weight of the mixture in the reactor.

The calculation of the conversion factor F is based on a polynomial function whose coefficients are connected to the plant experience and certain reaction variables such as the propylene temperature, the recycling temperature, the total solid and molar percentage of diluting agent in the gaseous phase of the reactor 11. The coefficients used for the calculation of the conversion factor are recipe parameters and, in order to obtain good results, they must be periodically updated, preferably every six months after the start-up of the plant, or after a congruous running period of the lines, observing a plethora of products.

The finishing potentiality is calculated as the ratio between the production, i.e. the number of polymer bales and a recipe parameter $K_{fines}$.

$K_{fines}$ represents the percentage of fine waste produced for each type of polymer; this percentage must be held in due consideration, as the fine waste is produced by the reactor but is not strictly measured in the finishing potentiality of the bales.

The difference between the finishing potentiality and the potentiality of the reactor can be used for understanding the possible discrepancy between the reaction production and in the finishing.

The Set point SP_COCAT of the flow-rate of COCAT is calculated as:

SP_COCAT=(RAPP_COCAT_CAT*(MW_COCAT/ MW_CAT)*P_CAT/ 1000*DENS_CAT*CONC_CAT/100)*1000/ DENS_COCAT wherein:
RAPP_COCAT_CAT is a recipe parameter which represents the molar ratio between COCAT and CAT and derives from experimentations of the Natta catalysis in the plant in question and can be modified by the control system in relation to the mechanical features and composition of the product;

CONC_CAT is a recipe parameter representing the weight percentage concentration of CAT in oil;

MW_COCAT is a pre-defined coefficient representing the molecular weight of COCAT;

MW_CAT is a pre-defined coefficient representing the molecular weight of CAT;

P_CAT is the flow-rate of CAT detected and expressed in l/h;

DENS_CAT is a pre-defined coefficient representing the density of CAT expressed in $kg/m^3$;

DENS_COCAT is a pre-defined coefficient representing the density of COCAT expressed in $kg/m^3$.

The SP_ATT set point of the flow-rate of ATT is calculated as follows:

$$SP\_ATT=(RAPP\_ATT\_CAT*P\_CAT/1000*DENS\_CAT*CONC\_CAT/100)*1000/DENS\_ATT;$$

wherein:

RAPP_ATT_CAT is a recipe parameter representing the weight ratio between ATT and CAT;

CONC_CAT is a recipe parameter representing the weight percentage concentration of CAT in oil;

P_CAT is the flow-rate of CAT expressed in l/h;

DENS_CAT is a pre-defined coefficient representing the density of CAT expressed in $kg/m^3$;

DENS_ATT is a pre-defined coefficient representing the density of ATT expressed in $kg/m^3$.

The yield is advantageously used for indicating the efficiency of the reaction and is calculated as follows:

$$Yield=reactor\ potentiality*1000/(P\_CAT/1000*DENS\_CAT*CONC\_CAT/100*1000*(MW\_CATM/MW\_CAT))$$

wherein:

CONC_CAT is a recipe parameter representing the weight percentage concentration of CAT in oil;

MW_CATM is a pre-defined coefficient representing the molecular weight of the metal CAT;

MW_CAT is a pre-defined coefficient representing the molecular weight of CAT;

P_CAT is the flow-rate of CAT detected and expressed in l/h;

DENS_CAT is a pre-defined coefficient representing the density of CAT expressed in $kg/m^3$.

The set point of propylene fed to the reactor is determined based on the calculated value of the total solid and target value of total solid which is a recipe parameter. In the calculation of the propylene set point, the catalyst flow-rate is preferably not considered, as it is negligible. In particular, in the case of the production of EPDR rubber, the propylene set point SP_Propylene is calculated as follows:

$$SP\_Propylene=Production\ potentiality\ of\ the\ reactor*1000/TOTSOL\_target/100-ETHYLENE-P\_DIENE/1000*DENS\_DIENE-Propylene\ fluxing;$$

wherein:

TOTSOL_target is a recipe parameter representing the weight percentage of rubber with respect to the total weight of the mixture in the reactor;

P_DIENE is the flow-rate of DIENE fed to the reactor detected and expressed in l/h;

ETHYLENE is the flow-rate of ETHYLENE fed to the reactor detected and expressed in kg/h;

Propylene fluxing is the fluxing flow-rate of propylene fed to the reactor detected and expressed in kg/h;

DENS_DIENE is a predefined coefficient representing the Diene density expressed in $kg/m^3$.

The control method also comprises the step in which the concentration of polymer is determined, by means of a second calculation module 21 of the above-mentioned plurality of calculation modules, in the at least one reactor 11, in the first stripper 12 and in the at least one recycling vat 13 of fine products, on the basis of the production potentiality value of the reactor determined in the first calculation module 20, the recipe parameters, the laboratory analysis results, the predefined coefficients and the data measured by the measurement equipment.

This second calculation module 21 is, preferably, configured for determining the concentration of polymer also inside the second 17 and third stripper 18. This calculation is based on the balance of material and energy of each apparatus.

The concentration of polymer in the reactor 11 is important for avoiding clogging due to the high concentration. The polymer concentration in the stripping section is extremely important for maximizing the stripping efficiency and because it helps the operator to avoid clogging due to the high concentration, preventing damage to the finishing machines caused by operating with low loads as a result of the low concentration. The polymer concentration in the recycling vat 13 of fine products is used for considering the recycling of fine products in the water recycled from the finishing.

This second calculation module 21 is, preferably, configured for also calculating the set point of the water recycled from the finishing or refilling or make-up to keep constant the concentration of polymer in the strippers.

During the production of non-oil-extended grades, the water coming from the finishing section is completely recycled to the high-pressure stripper.

During the production of oil-extended grades, the water coming from the finishing section is partly recycled to the first high-pressure stripper 12 and partly to the second low-pressure stripper 17 so as to have the polymer concentration equal to a respective recipe parameter called target polymer concentration and the residence time in the equipment equal to a respective recipe parameter called target residence time, in order to obtain an optimal distribution of oil in the rubber.

The recycled water is not normally sent to the third low-pressure stripper 18, but this operation for sending the recycled water to the third stripper 18 can be selected by the operator in the case of anomaly.

The control method advantageously also comprises the step for determining, by means of a third calculation module 22 of the above-mentioned plurality of calculation modules, the flow-rate of oil for feeding the second stripper 17, in order to obtain a weight percentage fraction of oil equal to a respective recipe parameter called target weight percentage fraction of oil on the basis of the production potentiality value of the at least one reactor 11 determined by the first calculation module 20, the concentration value of the polymer in the first stripper 12, determined by the second calculation module 21, the recipe parameters, the laboratory analysis results, the predefined coefficients and the data measured by the measurement equipment.

The oil is fed into the second low-pressure stripper 17 for oil-extended grades and, in relation to the grade itself, white oil or yellow oil can be fed. The production plant has two selectors that select the flow-rate controller of the white-oil or that of the yellow oil; the selection is managed by the central control unit through the recipe parameters. The oil flow-rate in the second low-pressure stripper 17 is calculated by means of the following formula:

> Set point of the OIL flow-rate=(Polymer concentration in the first high-pressure stripper 12\*quantity of liquid leaving the first high-pressure stripper 12\*target weight percentage fraction of OIL)/(100−target weight percentage fraction OIL)/OIL density;

wherein the concentration of polymer in the first high-pressure stripper 12 and the quantity of liquid leaving the first high-pressure stripper 12 are calculated in the second calculation module 21; in particular, "quantity of liquid leaving the first stripper 12" refers to the product of the total flow-rate leaving the first stripper 12 by the concentration of polymer in the same calculated and expressed in g of polymer/l of slurry;

oil density is a predefined coefficient representing the density of the oil expressed in $kg/m^3$;

target weight percentage fraction of OIL on the finished product is a recipe parameter.

The second calculation module 21 continuously controls the difference in the concentration of oil between the target oil concentration and the concentration resulting from the laboratory analytical data and calculates the quantity of oil necessary for reaching the target weight percentage fraction of oil over the finished product according to a predetermined law of forcing, which can, for example, be a linear law. Should this quantity prove to be higher than a predetermined threshold, the control method provides that the operator make a rapid addition of oil indicating the amount to be added. If the oil is in excess, the stoppage time, preferably in minutes, of the oil flow-rate to strippers is calculated in order to restore the target weight percentage fraction of oil.

The control method according to the present invention also involves determining, by means of a fourth calculation module 23 of the above-mentioned plurality of calculation modules, the flow-rate of the chain terminator (TERM) for feeding the at least one reactor 11 in order to obtain a substantially constant viscosity value of the polymer and equal to a respective recipe parameter, called target viscosity of the polymer, and a molar percentage fraction value of TERM equal to a respective recipe parameter called TERM target percentage molar fraction, on the basis of a production potentiality value of the at least one reactor 11 determined by the first calculation module 20, the recipe parameters, the laboratory analysis results and the predefined coefficients and data obtained from the measurement equipment.

The fourth calculation module 23 is configured for calculating:

the set point SP_TERM of the flow-rate of the chain terminator (TERM) fed to the reactor 11 expressed in $Nm^3/h$;

the set point SP_PURGE of the vent flow-rate from the thermostatic circuit of the reactor 11 expressed in $Nm^3/h$;

The TERM target percentage molar fraction is, in particular, determined based on a Mooney viscosity analytical value. The calculation of the SP_TERM set point also depends on the yield variation, the trend of non-linear extrapolations of the chromatographic measurement of the TERM molar percentage fraction and on the on-line viscosity estimate.

In particular, the polymeric yield is an indicator of the length of the chains being formed in the reactor 11. The variation in the yield is therefore used by the control system for preventing variations in the weight average molecular weight, which are correlated with variations in the Mooney viscosity.

The Mooney viscosity analytical data are transmitted to the central electronic processing and control unit 16 periodically, for example every 2-4 hours, but in the interval between one laboratory measurement and the other, the control system effects an on-line predictive estimation of the viscosity through a neural network based on statistical data and correlations. The above-mentioned neural network learns from the process and is re-calibrated by means of the same periodically acquired analytical data.

If the composition of the chain terminator in the gas phase is greater with respect to that predicted by a respective chain-terminator concentration recipe parameter, the terminator itself must be vented from the thermostatic circuit of the reactor.

The set point SP_PURGE is calculated by considering the excess of chain terminator in the gas phase of the reactor and the recycling flow-rate of the gas phase.

The plurality of control variables preferably comprises the flow-rate of the third monomer with which the at least one reactor 11 is fed, and the method comprises the step in which the flow-rate of the third monomer is determined, by means of a fifth calculation module 24 of the above-mentioned plurality of calculation modules, in order to obtain a concentration of said third monomer equal to a recipe parameter called third monomer target concentration, on the basis of the production potentiality value of the at least one reactor 11 determined in the first calculation module 20, the recipe parameters, the laboratory analysis results, the predefined coefficients and data measured by the measurement equipment.

The flow-rate of the third DIENE monomer fed to the reactor 11 is calculated with the following simplified formula:

> Set point of the DIENE flow-rate=(Potentiality of the reactor\*target concentration of DIENE)/ (conversion of DIENE\*purity of DIENE)

wherein:

Target concentration of DIENE and purity of DIENE are recipe parameters;

DIENE conversion is a predefined coefficient.

The DIENE conversion is not a perfect stoichiometric conversion and indicates the quantity of Diene fed that has been effectively bound to the polymer; in order to calculate this parameter, the quantity of polymer that has passed through the reactor and the first stripper in the period between the two consecutive samplings, must be known.

The DIENE conversion is cyclically updated by the central electronic processing and control unit using the results of laboratory analyses through the following formula:

> New DIENE conversion=(analytical concentration of DIENE/target concentration of DIENE)\*previous DIENE conversion.

The initial DIENE conversion, with which the plant starts without laboratory analyses, is the result of statistical processings of optimal runnings, processings that are performed on-line and stored in a suitable data-base.

The plurality of control variables preferably comprises the flow-rate of antipacking agent with which the first stripper 12 is fed and the control method comprises the step of determining, by means of a sixth calculation module 25 of the above-mentioned plurality of calculation modules, the flow-rate of antipacking agent in order to obtain a weight percentage fraction of antipacking agent equal to a respective recipe parameter called target weight percentage fraction of antipacking agent on the basis of the production potentiality value of the at least one reactor 11 determined in the first calculation module 20, the recipe parameters, the laboratory analysis results, the predefined coefficients and the data measured by the measurement equipment.

The antipacking agent is fed into the first stripper to avoid the formation of rubber agglomerates and clogging of the stripper. The flow-rate of antipacking agent ANTISTICK fed to the first stripper 12 is calculated with the following simplified formula:

Set point of the flow-rate of ANTISTICK=(production potentiality of the reactor comprising oil*target percentage fraction of ANTISTICK)/(concentration of ANTISTICK)

wherein:
the production potentiality of the at least one reactor 11 comprising oil is expressed in t/h of dry rubber produced plus the oil added in the stripping section and is calculated in the first calculation module 20.

Concentration of ANTISTICK is a predefined coefficient equal to 1% or 1.5% depending on the preparation of antipacking agent and indicates the dilution in g/l of antipacking agent in the solution that conveys it in the process.

Target weight percentage fraction of ANTISTICK is a recipe parameter expressed in weight ppm.

Furthermore, in order to manage the non-stationary states, such as the change of grade, and rapidly reach the target weight percentage fraction of ANTISTICK, the control method provides that the operator can vary the target weight percentage fraction of ANTISTICK. In addition, the electronic central processing and control unit 16 is configured for receiving from a specific sensor, a signal representing the power absorbed by the stirrer of the first stripper 12 to have a rapid response for a possible clog.

In order to refine the result of the sixth calculation module 25, the set point of ANTISTICK is also calculated based on a "forcing" factor based on the current plant experience.

Said forcing coefficient is only applied if the power absorption is above a certain threshold and increases if the power absorption is increasing.

The plurality of control variables preferably comprises the flow-rate of the second monomer, for example propylene, in a mixture with a diluent, for example alkane, for feeding a supply tank of the at least one reactor 11, and the control method comprises the step of determining, by means of a seventh calculation module 26 of the above-mentioned plurality of calculation modules, the flow-rate of the second monomer, in order to obtain a concentration of the diluent equal to a respective recipe parameter called target concentration of the diluent on the basis of the production potentiality value of the at least one reactor 11 determined in the first calculation module 20, the recipe parameters, the laboratory analysis results and the predefined coefficients and data measured by the measurement equipment.

The flow-rate of the second propylene monomer mixed with the diluent is calculated with the following formula:

Set point of the flow-rate of propylene mixed with the diluent=Production potentiality of the reactor*target concentration of diluent)/(concentration of propylene)

wherein:
Concentration of propylene is a predefined coefficient linked to the purity of the propylene, normally equal to 97%;

Target concentration of diluent.

Furthermore, the calculation of the set point of the flow-rate of propylene mixed with the diluent takes into account the leakages of propylene and diluent from the C3 column and deviation of the concentration of diluent in the gas phase of the reactor.

The above simplified formula is multiplied by a coefficient that is an exponential function of the ratio (Target concentration of diluent)/(Concentration of diluent+Concentration of propylene, detected by the gas chromatograph).

The plurality of control variables preferably comprises the flow-rate of antioxidant for feeding the first stripper 12, and the control method comprises the step of determining, by means of an eighth calculation module 27 of the above-mentioned plurality of calculation modules, the flow-rate of antioxidant in order to obtain a weight percentage fraction of antioxidant equal to a respective recipe parameter called target weight percentage fraction of antioxidant on the basis of the production potentiality value of the at least one reactor 11 determined in the first calculation module 20, the recipe parameters, the laboratory analysis results and the predefined coefficients and data measured by the measurement equipment.

The antioxidant ANTIOX is fed into the first stripper 12 to prevent the oxidation of the rubber during storage. The flow-rate of antioxidant fed to the first stripper 12 is calculated with the following formula:

Set point of the flow-rate of ANTIOX=(Potentiality of the reactor*target weight percentage fraction of ANTIOX)/(concentration of ANTIOX)

wherein:
Concentration of ANTIOX is a predefined coefficient normally equal to 50% and indicates the dilution of antioxidant expressed in g/l in the solution that conveys it in the process;

Target weight percentage fraction of ANTIOX is a recipe parameter and indicates a weight percentage in the polymer produced.

Furthermore, in order to manage the non-stationary states, such as the change of grade, and rapidly reach the target content of ANTIOX, the control method provides for the operator the opportunity of varying the target concentration of ANTIOX.

To be able to refine the result of the calculation, the set point of ANTIOX is calculated taking into consideration the multiplicative "forcing" and "transfer" factors based on the current plant experience.

The plurality of control variables preferably comprises the flow-rate of a pH-adjusting agent, such as, for example, soda, for feeding the first stripper 12, in order to reduce the risk of corroding the equipment and the emission of Chlorine into the wastewater and stack. In this case, the method comprises the step of determining, by means of a ninth calculation module 28 of the above-mentioned plurality of calculation modules, the flow-rate of pH-adjusting agent in order to obtain a stripping bath with a pH equal to a respective recipe parameter called pH target based on the recipe parameters, the laboratory analysis results and the predefined coefficients and data measured by the measurement equipment.

The pH-adjusting agent is fed to the first high-pressure stripper in order to keep the pH of the stripping bath constant. The pH-adjusting agent is fed to neutralize the acidity of the catalytic residues. The flow-rate of pH-adjusting agent, in l/h, fed to the first high-pressure stripper 12 is calculated with the following formula:

Set point of the flow-rate of pH-adjusting agent=
   (COCAT/MW_COCAT*MW_pH-adjusting
   agent*DENS_COCAT+P_ATT/
   MW_ATT*MW_pH-adjusting
   agent*DENS_ATT+K_cond_water*cond_water)/
   (CONC_pH-adjusting agent)*100/DENS_pH-
   adjusting agent wherein:
   COCAT indicates the flow of COCAT expressed in l/h flow-rate;
   MW_COCAT is a predefined coefficient that represents the molecular weight of COCAT;
   DENS_COCAT is a predefined coefficient that represents the density of COCAT expressed in $kg/m^3$;
   P_ATT represents the flow-rate of ATT detected and expressed in l/h;
   MW_ATT is a predefined coefficient that represents the molecular weight of ATT;
   DENS_ATT is a predefined coefficient that represents the density of ATT expressed in $kg/m^3$;
   DENS_pH-adjusting agent is a predefined coefficient that represents the density of pH-adjusting agent expressed in $kg/m^3$;
   CONC_pH-adjusting agent is a predefined coefficient that represents the concentration of pH-adjusting agent in the aqueous solution;
   MW_pH-adjusting agent is a predefined coefficient that represents the molecular weight of MW_pH-adjusting agent;
   K_cond_water is a predefined coefficient that represents the concentration of pH-adjusting agent and relates to the formula of pOH in g/l;
   cond_water is a predefined coefficient that estimates the condensed steam fed to the stripper and the water from the finishing section in the case of problems relating to the recycling system of water from the finishing.

To be able to refine the result of the calculation, the set point of final soda is calculated based on the difference between the analytical datum and the recipe target, taking into consideration the multiplicative "forcing" and "transfer" factors based on the current plant experience.

The plurality of control variables preferably comprises the flow-rate of the first monomer for feeding the at least one reactor 11, and the control method comprises the step of determining, by means of a tenth calculation module 29 of the above-mentioned plurality of calculation modules, the flow-rate of the first monomer in order to obtain a molar ratio between the monomers deriving from the type of catalysis used based on the recipe parameters, the laboratory analysis results and the predefined coefficients and said data measured by the measurement equipment.

Furthermore, in order to manage the non-stationary states and rapidly reach the target of the calculation modules, the control method provides that the operator can vary these target parameters.

The features of the control system and method, subject of the present invention, are evident from the above description, as the relative advantages are clear.

The control method and system according to the present invention allow automatic and real time adjustments to be carried out, which ensure the production of polymers within the production specifications. The adjustments are deterministic, and therefore repeatable, and are based not only on recipe parameters and theoretical data but also on laboratory analysis results.

These adjustments make the plant production independent of the seasonality of production campaigns.

Finally, the control system and method thus conceived can evidently undergo numerous modifications and variants, all included in the invention; furthermore, all the details can be substituted by technically equivalent elements. In practice, the materials used, as also the dimensions, can vary according to technical requirements.

The invention claimed is:

1. A method for the control of a plant for the production in continuous of a polymer, wherein said plant comprises a reaction section comprising at least one reactor fed with at least a first monomer and a second monomer, a stripping section comprising a first high-pressure stripper, a second low-pressure stripper, a third low-pressure stripper, a finishing section comprising at least one recycling vat of the fine products, a plurality of measurement equipment of the operational conditions of said plant and a control system comprising a plurality of distributed control devices controlled by at least one electronic processing and control unit on the basis of a plurality of control variables comprising at least the production potentiality value of said at least one reactor, the oil flow-rate for feeding said second low-pressure stripper, and the flow-rate of chain terminator for feeding said at least one reactor, and the vent flow-rate of a thermostatic circuit of said at least one reactor, said plurality of control variables being calculated by a plurality of calculation modules, said control method comprising:
   collecting a plurality of data comprising:
      recipe parameters, wherein the recipe parameters are designed in order to define production specifications of said polymer,
      results of laboratory analyses, wherein said laboratory analysis results are carried out on product samples collected at an outlet of said plant at pre-established time intervals, and
      predefined coefficients stored in databases, wherein said predefined coefficients are referred to parameters used for the calculation of said plurality of control variables;
   collecting the data measured by said measurement equipment;
   determining, by a first calculation module of said plurality of calculation modules, the production potentiality value of said at least one reactor on the basis of said recipe parameters, said laboratory analysis results, said predefined coefficients and said data measured by said measurement equipment;
   determining, by a second calculation module of said plurality of calculation modules, the polymer concentration in said at least one reactor, in said first stripper and in said at least one recycling vat of the fine products, based on the production potentiality value of the at least one reactor determined by said first calculation module, said recipe parameters, said laboratory analysis results, said predefined coefficients and said data measured by said measurement equipment;
   determining, by a third calculation module of said plurality of calculation modules, said oil flow-rate for feeding said second stripper, in order to obtain a weight percentage fraction of oil equal to a respective recipe parameter called target weight percentage fraction of oil on the basis of said production potentiality value of the at least one reactor determined by said first calculation module, of the concentration value of the polymer in the first stripper determined by the second calculation module, said recipe parameters, said laboratory analysis results, said predefined coefficients and said data measured by the measurement equipment;

determining, by a fourth calculation module of said plurality of calculation modules, the flow-rate of the chain terminator (TERM) for feeding said at least one reactor and the vent flow-rate from the thermostatic circuit, in order to obtain a substantially constant viscosity value of the polymer and equal to a respective recipe parameter called target viscosity of the polymer, and a TERM molar percentage fraction value equal to a respective recipe parameter called target TERM molar percentage fraction, based on the production potentiality value of said at least one reactor determined by said first calculation module, said recipe parameters, said laboratory analysis results, said predefined coefficients and said data measured by the measurement equipment;

controlling, by said at least one electronic processing and control unit, said plant based on said plurality of control variables determined.

2. The method according to claim 1, wherein said production potentiality value of said at least one reactor is calculated as a ratio between a recycling flow-rate to the at least one reactor detected by one of said measurement equipment and a conversion factor.

3. The method according to claim 1, wherein said plurality of control variables further comprises the flow-rate of a third monomer for feeding said at least one reactor, said method further comprising:

determining, by a fifth calculation module of said plurality of calculation modules, the flow-rate of the third monomer in order to obtain a concentration of said third monomer equal to a recipe parameter called third monomer target concentration based on the production potentiality value of the at least one reactor determined by said first calculation module, said recipe parameters, said laboratory analysis results, said predefined coefficients and said data measured by the measurement equipment.

4. The method according to claim 1, wherein said plurality of control variables further comprises the flow-rate of antihacking agent for feeding said first stripper, said method further comprising:

determining, by a sixth calculation module of said plurality of calculation modules, the flow-rate of antipacking agent in order to obtain a weight percentage fraction of antipacking agent equal to a respective recipe parameter called target weight percentage fraction of antipacking agent based on the production potentiality value of the at least one reactor determined by said first calculation module, said recipe parameters, said laboratory analysis results, said predefined coefficients and said data measured by the measurement equipment.

5. The method according to claim 1, wherein said plurality of control variables further comprises the flow-rate of said second monomer in a mixture with a diluent for feeding a process tank, said method further comprising:

determining, by a seventh calculation module of said plurality of calculation modules, the flow-rate of the second monomer in a mixture with a diluent in order to obtain a concentration of the diluent equal to a respective recipe parameter called target concentration of the diluent based on the production potentiality value of the at least one reactor determined in the first calculation module, the recipe parameters, the laboratory analysis results and the predefined coefficients and said data measured by the measurement equipment.

6. The method according to claim 1, wherein said plurality of control variables further comprises the flow-rate of antioxidant for feeding said first stripper, said method further comprising:

determining, by an eighth calculation module of said plurality of calculation modules, the flow-rate of antioxidant in order to obtain a weight percentage fraction of antioxidant equal to a respective recipe parameter called target weight percentage fraction of antioxidant based on the production potentiality value of the at least one reactor determined in the first calculation module, the recipe parameters, the laboratory analysis results and the predefined coefficients and said data measured by the measurement equipment.

7. The method according to claim 1, wherein said plurality of control variables further comprises the flow-rate of pH-adjusting agent for feeding said first stripper, said method further comprising:

determining, by a ninth calculation module of said plurality of calculation modules, the flow-rate of pH-adjusting agent in order to obtain a stripping bath with a pH equal to a respective recipe parameter called target pH on the basis of the recipe parameters, the laboratory analysis results and the predefined coefficients and said data measured by the measurement equipment.

8. The method according to claim 1, wherein said plurality of control variables further comprises the flow-rate of said first monomer for feeding said at least one reactor, said method further comprising:

determining, by a tenth calculation module of said plurality of calculation modules, the flow-rate of said first monomer with which to fed said at least one reactor (11) in order to obtain a molar ratio between the monomers deriving from the type of catalysis used on the basis of the recipe parameters, the laboratory analysis results and the predefined coefficients and said data measured by the measurement equipment.

9. A system for controlling a plant for the production in continuous of a polymer, wherein said plant comprises a reaction section comprising at least one reactor fed with at least a first monomer and a second monomer, a stripping section comprising a first high-pressure stripper, a second low-pressure stripper, a third low-pressure stripper, a finishing section comprising at least one recycling vat of the fine products, a plurality of measurement equipment of the operational conditions of said plant, said control system comprising:

a plurality of distributed control devices and
at least one electronic processing and control unit suitable for controlling said plurality of distributed control devices and configured for implementing the control method according to claim 1.

10. A plant for the production in continuous of a polymer comprising:

a reaction section comprising at least one reactor fed with at least a first monomer and a second monomer;
a stripping section comprising a first high-pressure stripper, a second low-pressure stripper, a third low-pressure stripper;
a finishing section comprising at least one recycling vat of the fine products;
a plurality of measurement equipment of the operational conditions of said plant; and
a control system according to claim 9.

* * * * *